(12) United States Patent
Lee et al.

(10) Patent No.: US 6,792,034 B1
(45) Date of Patent: Sep. 14, 2004

(54) ADAPTIVE MULTI-USERS INTERFERENCE REDUCTION AND CANCELLATION IN A CDMA NETWORK

(75) Inventors: Xiaoyang Lee, Monmouth Junction, NJ (US); Jay Bao, Bridgewater, NJ (US); Jyhchau Horng, Warren, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 741 days.

(21) Appl. No.: 09/684,408

(22) Filed: Oct. 6, 2000

(51) Int. Cl.[7] ................................ H04B 1/69
(52) U.S. Cl. ................ 375/148; 375/144; 375/147
(58) Field of Search ................ 375/136, 141, 375/144, 148, 285, 346

(56) References Cited

U.S. PATENT DOCUMENTS

| | | | | |
|---|---|---|---|---|
| 5,343,496 A | * | 8/1994 | Honig et al. | 370/342 |
| 5,822,380 A | * | 10/1998 | Bottomley | 375/347 |
| 6,088,383 A | * | 7/2000 | Suzuki et al. | 375/148 |
| 6,574,270 B1 | * | 6/2003 | Madkour et al. | 375/148 |

* cited by examiner

*Primary Examiner*—Khai Tran
*Assistant Examiner*—Qutub Ghulamali
(74) *Attorney, Agent, or Firm*—Dru Brinkman; Andrew J. Curtin

(57) ABSTRACT

A method reduces interference adaptively in a CDMA receiver. A baseband signal is demodulated to determine target symbols. The baseband signal is also demodulated to estimate interfering symbols. The interfering symbols are modulated to generate a cancellation signal, and the cancellation signal is subtracted from the base band signal to reduce interference in the target symbols.

17 Claims, 1 Drawing Sheet

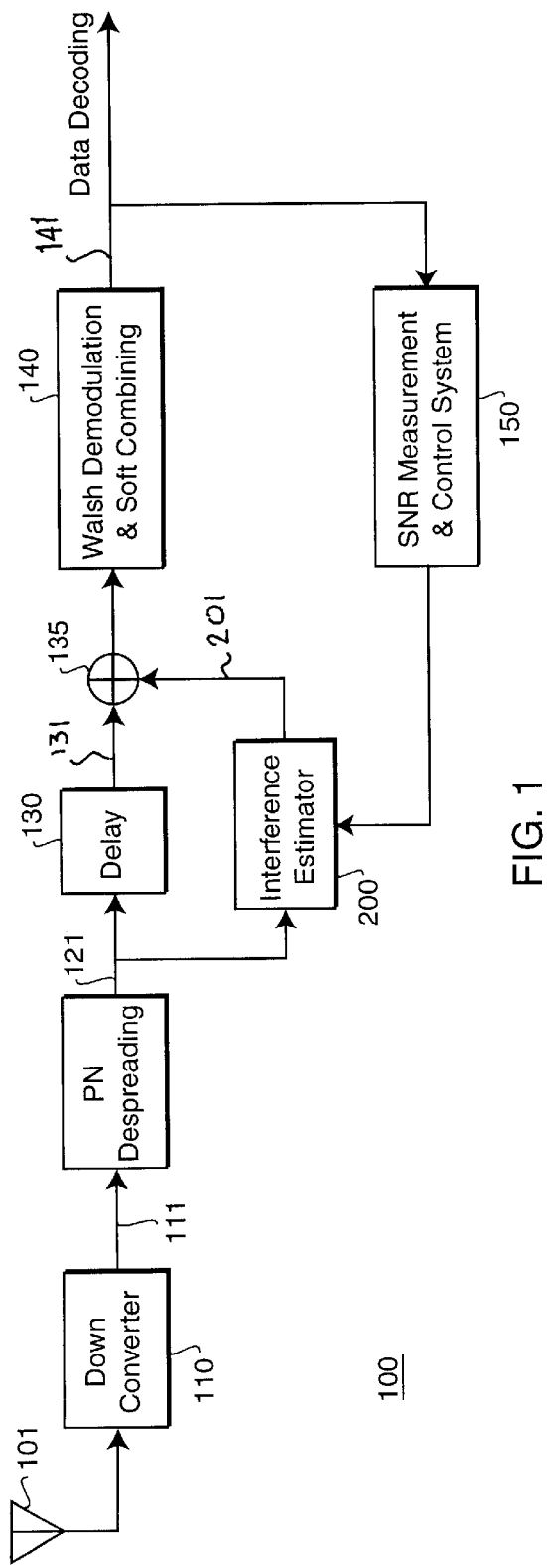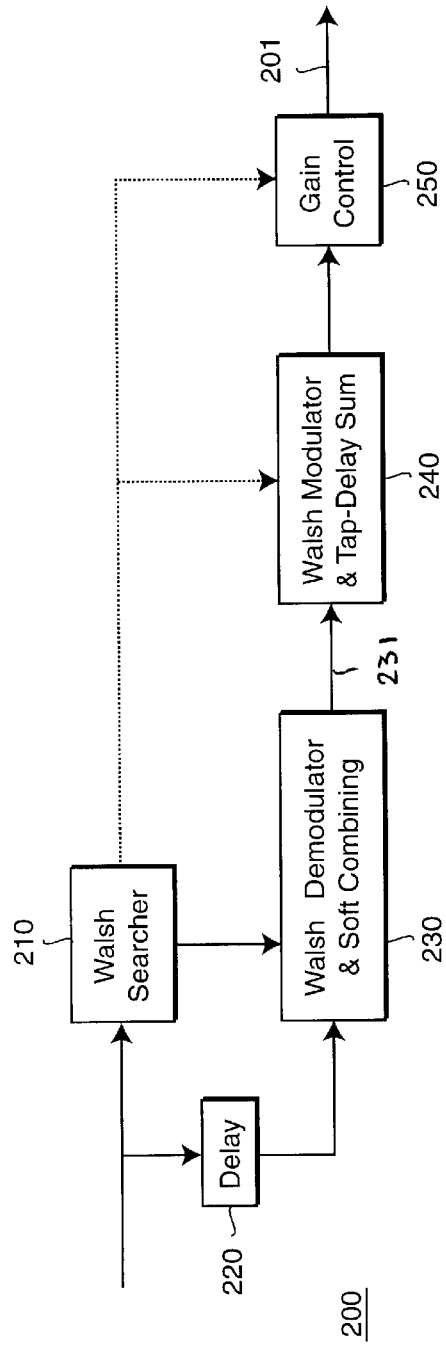
FIG. 1
FIG. 2

ADAPTIVE MULTI-USERS INTERFERENCE REDUCTION AND CANCELLATION IN A CDMA NETWORK

FIELD OF THE INVENTION

The present invention relates generally to code division multiple access (CDMA) communication networks, and more particularly, to interference reduction and cancellation in mobile CDMA networks.

BACKGROUND OF THE INVENTION

A third generation (3G) code division multiple access (CDMA) can concurrently supports multiple services and multiple symbol rates on multiple channels. For example, services can include data services at relatively high symbol rates, and voice services at relatively low symbol rates. It is very difficult to find a simple solution that supports variable symbol rates for the various services, in real time, particularly, when the channels are confined to a fixed frequency and fixed bandwidth, i.e., a fixed "chip" rate.

In a CDMA network, the symbols representing data and voice signals can be orthogonally modulated using quadrature variable length Walsh codes to distinguish the respective channels and minimize cross-correlation. Error correction is typically carried out by convolution coding using variable encoding rates for the respective channels. Combining the CDMA with a spread-spectrum technique can increase network capacity. This makes each orthogonally coded control and traffic channel of the CDMA network practical for broadcast and mobile digital cellular networks (DCN).

A variable length Walsh code can be denoted as $W_N^M$, where N is the Nth row of the Walsh metrics, and M is the length of a specific Walsh code W. For a channel with a given bandwidth, e.g., 1.25 MHz, and a fixed spreading/modulation method, e.g., quadrature phase shift keying (QPSK), higher symbol rates are modulated with shorter length Walsh codes and lower symbol rates are modulated with longer Walsh codes. This code assignment ensures that the symbols on the various channels remain orthogonal.

For a desired frame error rate (FER), the signal power must vary with the symbol rate. Usually, high symbol rate data services require a lower FER than low symbol rate voice services. Consequently, on a channel providing data services, the symbols are transmitted at a relatively higher signal power than on channels providing voice services. As a result, high symbol rate channels can interfere with low symbol rate channels, especially in a mobile communications network, such as a cellular phone network where a base station concurrently transmits symbols for data and voice services on multiple channels. Depending on the relative locations of the mobile receivers, the interference can become so serious that low power signals cannot be recovered.

Therefore, it is desired to reduce interference in a wireless communications network that simultaneously supports asymmetric services such as Internet data access and voice communications in real time, particularly when the receivers in the network are mobile.

SUMMARY OF THE INVENTION

The invention provides reliable communication channels in a CDMA network. The invention is particularly suited for mobile networks where symbols are concurrently transmitted over multiple fixed frequency and fixed bandwidth channels at variable symbol rates and signal powers. More particularly, the invention provides reliable low signal power voice services in the presence of high signal power data services that otherwise would interfere to meet associated application needs. More specifically, the invention can provide a mobile user good voice communications while experiencing strong interference from high data rate users.

The invention method and apparatus reduces interference adaptively in a CDMA receiver. A baseband signal is demodulated to determine target symbols. The baseband signal is also demodulated to estimate interfering symbols. The interfering symbols are modulated to generate a cancellation signal, and the cancellation signal is subtracted from the base band signal to reduce interference.

BRIEF DESCRIPTION OF THE DRAWINGS

FIG. 1 is a block diagram of an apparatus to reduce interference according to the invention; and FIG. 2 is a block diagram of an interference estimator of the apparatus of claim 1;

DETAILED DESCRIPTION OF THE PREFERRED EMBODIMENT

This invention provides means that adaptive reduce interference in a CDMA network to improve performance on low symbol rate-low signal power voice channels in the presence of high symbol rate, high signal power data channels.

FIG. 1 shows an apparatus 100 for reducing interference in symbols received via a CDMA channel. The apparatus can be used in a mobile receiver or the receiver of a fixed base station.

The apparatus includes a down-converter 110 connected to an antenna 101 to receive a spread-spectrum signal. The down-converter produces a baseband signal 111 from the received RF signal. De-spreading of user-specific pseudo random noise (PN) sequences on the baseband signal takes place in the PN de-spreader 120 The de-spreader can include a complex multiplier and an integrator. Spread-spectrum signals provide multiple-access. The de-spreaded signal is fed to a delay controller 130 and a Walsh decoder 140 before the target symbols 141 are fully decoded.

As stated above, the received signal can be mixed with a high power interference signal intended for an other high symbol rate user. The interfering signal is spread with a short-length orthogonal Walsh code. In general, due to the power control and targeted service requirements, e.g., a desired SNR, higher symbol rates have higher power and shorted code lengths.

Therefore, before Walsh demodulation and soft combining, the receiver according to the invention performs interference reduction, or cancellation, to improve performance.

An interference estimator 200 is used to estimate the high power interfering symbols. From the interfering symbols, the estimator generates a cancellation signal 201 that approximates the interference. The cancellation signal 201 is then subtracted 135 from the delayed PN-de-spreaded signal 131 to form the input to the Walsh demodulation block 140. A control system 150 measures a signal-to-noise ratio (SNR) of the partially decoded target symbols 141, and compares the measured SNR with a pre-determined threshold. If the SNR is greater than the predetermined threshold, the interference estimator 200 is activated. If the SNR is below the threshold the estimator 200 is not required.

FIG. 2 shows the interference estimator 200 in greater detail. The estimator includes a Walsh searcher 210, a delay 220, a Walsh demodulator 230, an adder 240, and a gain controller 250. The estimator also receives the de-spreaded baseband signal 121. The function of the estimator 200 is to generate a cancellation signal 201. The estimated cancellation signal is then subtracted from the delayed de-spreaded signal 131 to reduce or cancel interference.

The searcher 210 attempts to find the Walsh code of the high symbol rate user signal so that the interfering signal can be re-generate. Because the Walsh code of the high power interfering signal is short, the Walsh code is one of a small set of candidate codes. Thus, in a low complex implementation, a trial and error method can be used to estimate the Walsh code of the interfering signal.

In general, the searcher 210 can perform a partial correlation between Walsh code of the input signal 121 and all possible candidate codes, and find the Walsh code with the maximum likelihood. After the partial Walsh code has been found, the interfering signal is demodulated in block 230 to produce estimated interfering symbols 131. Block 240 is used to generate the cancellation signal 201 from the estimated interfering symbols, as transmitted for the high symbol rate user. The gain controller 250 matches the power of the cancellation signal 210 with the power of the de-spreaded signal 121. The cancellation signal 201 is than subtracted 135 from the delayed de-spreaded signal 121 to reduce or cancel interference. The delay controller 130 delays the de-spreaded signal 121 by a time interval that is equal to the latency of the Walsh estimator 200.

Although the invention has been described with respect to a mobile receiver in a wireless CDMA network, it should be understood that the invention can also be deployed in a receiver of a fixed base station, or any other type of CDMA receiver, for example, a satellite receiver.

As an advantage, the base station has access to the Walsh codes that are used by the mobile receivers. Therefore, the base station actually re-generate the interfering signal directly to effect interference cancellation in the physical media independent layer (PHY).

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing interference adaptively in a CDMA receiver, comprising the steps of:
   demodulating a baseband signal to determine target symbols, wherein the target symbols are transmitted at a relatively low symbol rate and low signal power;
   demodulating the baseband signal to determine interfering symbols, wherein the interfering symbols are transmitted at a relatively high symbol rate and a high signal power;
   modulating the interfering symbols to generate a cancellation signal; and
   subtracting the cancellation signal from the base band signal to reduce interference in the target symbols.

2. The method of claim 1 wherein the receiver is mobile and the demodulating is partial to estimate the interfering symbols.

3. The method of claim 1 wherein the receiver is fixed and the demodulating is full to cancel all of the interference in the target symbols.

4. The method of claim 1 further comprising:
   measuring a signal-to-noise ratio (SNR) of the target symbols; and
   subtracting the cancellation signal when the signal to noise ratio is greater than a predetermined threshold.

5. The method of claim 1 wherein the target symbols are modulated with a first Walsh code selected from a set of first Walsh codes and the interfering symbols are modulated with a second Walsh code selected from a set of second Walsh codes, and further comprising:
   correlating all members of the second set of Walsh codes; and
   selecting a particular second Walsh code with a maximum likelihood correlation to demodulate the baseband signal to estimate the interfering symbols.

6. The method of claim 5 wherein a length of the first Walsh codes is substantially shorter than a length of the second Walsh codes.

7. The method of claim 1 further comprising:
   matching a power level of the cancellation signal with a power level of the baseband signal.

8. The method of claim 1 further comprising:
   de-spreading the baseband signal; and
   delaying the de-spreaded baseband signal before determining the target symbols.

9. The method of claim 8 wherein the delay is equal to a length of time required to produce the cancellation signal.

10. An apparatus for reducing interference adaptively in a CDMA receiver, comprising:
    a first demodulator to determine target symbols from a baseband signal, wherein the target symbols are transmitted at a relatively low symbol rate and low signal power;
    a second demodulating to determine interfering symbols from the baseband signal, wherein the interfering symbols are transmitted at a relatively high symbol rate and a high signal power;
    a modulator to generate a cancellation signal from the interfering signal; and
    an adder to subtract the cancellation signal from the base band signal to reduce interference in the target symbols.

11. The apparatus of claim 10 wherein demodulation in the second demodulator is partial and the interfering symbols are estimated.

12. The apparatus of claim 10 wherein demodulating in the second demodulator is full to cancel all of the interference in the target symbols.

13. The apparatus of claim 10 further comprising:
    means for measuring a signal-to-noise ratio (SNR) of the target symbols, and
    wherein the adder subtracts the cancellation signal when the signal to noise ratio is greater than a predetermined threshold.

14. The apparatus of claim 10 wherein the target symbols are modulated with a first Walsh code selected from a set of first Walsh codes and the interfering symbols are modulated with a second Walsh code selected from a set of second Walsh codes, and further comprising:
    means for correlating all members of the second set of Walsh codes; and
    means for selecting a particular second Walsh code with a maximum likelihood correlation to demodulate the baseband signal to estimate the interfering symbols.

15. The apparatus of claim 10 further comprising:
    a gain controller to match a power level of the cancellation signal with a power level of the baseband signal.

16. The apparatus of claim 10 further comprising:
    a de-spreader de-spreading the baseband signal;
    a delay controller delaying the de-spreaded baseband signal before determining the target symbols.

17. The method of claim 16 wherein the delay is equal to a length of time required to produce the cancellation signal.

* * * * *